(12) United States Patent
Meng et al.

(10) Patent No.: US 10,867,531 B2
(45) Date of Patent: Dec. 15, 2020

(54) DISPLAY SCREEN, SPLICING DISPLAY SCREEN AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Ying Meng, Beijing (CN); Junwei Wang, Beijing (CN); Yang Li, Beijing (CN); Peng Sun, Beijing (CN); Bin Feng, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/328,824

(22) PCT Filed: Jan. 10, 2018

(86) PCT No.: PCT/CN2018/072028
§ 371 (c)(1),
(2) Date: Feb. 27, 2019

(87) PCT Pub. No.: WO2018/227959
PCT Pub. Date: Dec. 20, 2018

(65) Prior Publication Data
US 2019/0213923 A1    Jul. 11, 2019

(30) Foreign Application Priority Data
Jun. 12, 2017  (CN) .......................... 2017 1 0440056

(51) Int. Cl.
G02F 1/133    (2006.01)
G09F 9/30    (2006.01)
(Continued)

(52) U.S. Cl.
CPC .............. *G09F 9/30* (2013.01); *G02F 1/0115* (2013.01); *G02F 1/01708* (2013.01); *G09G 3/20* (2013.01);
(Continued)

(58) Field of Classification Search
None
See application file for complete search history.

(56) References Cited

U.S. PATENT DOCUMENTS

| 7,443,463 B2 | 10/2008 | Chang et al. |
| 7,907,112 B2 | 3/2011 | Chang et al. |

(Continued)

FOREIGN PATENT DOCUMENTS

| CN | 102216972 A | 10/2011 |
| CN | 103969864 A | 8/2014 |

(Continued)

OTHER PUBLICATIONS

Search Report and Written Opinion for International Application No. PCT/CN2018/072028 dated Jan. 10, 2018.

*Primary Examiner* — Richard H Kim
(74) *Attorney, Agent, or Firm* — Calfee, Halter & Griswold LLP (57) ABSTRACT

A display screen includes: a display panel with a display region and a non-display region, wherein the display region includes an intermediate display region and a peripheral display region surrounding the intermediate display region; an image expansion structure disposed in the peripheral display region, wherein the image expansion structure is configured to expand an image displayed by the peripheral display region of the display panel to the non-display region to cover the non-display region.

12 Claims, 6 Drawing Sheets

(51) Int. Cl.
  *G09G 3/20* (2006.01)
  *H05K 5/00* (2006.01)
  *G02F 1/017* (2006.01)
  *G02F 1/01* (2006.01)
  *G02F 1/1333* (2006.01)

(52) U.S. Cl.
  CPC .................. *H05K 5/0017* (2013.01); *G02F 2001/133388* (2013.01)

(56) References Cited

U.S. PATENT DOCUMENTS

| | | |
|---|---|---|
| 2006/0001796 A1 | 1/2006 | Chang et al. |
| 2007/0132778 A1* | 6/2007 | Gallen ............... G02F 1/13336 345/600 |
| 2009/0079681 A1 | 3/2009 | Chang et al. |
| 2010/0238090 A1 | 9/2010 | Pomerantz et al. |
| 2011/0255301 A1* | 10/2011 | Watanabe ........... G02F 1/13336 362/558 |
| 2017/0094814 A1* | 3/2017 | Chin ....................... G02B 6/08 |

FOREIGN PATENT DOCUMENTS

| | | |
|---|---|---|
| CN | 104516045 A | 4/2015 |
| CN | 107016935 A | 8/2017 |
| CN | 103969864 B | 9/2017 |
| EP | 2360662 A1 | 8/2011 |
| JP | H07128652 A | 5/1995 |
| WO | 2008122978 A2 | 10/2008 |

* cited by examiner

DISPLAY SCREEN, SPLICING DISPLAY SCREEN AND DISPLAY DEVICE

CROSS REFERENCE

The present application is based on International Application No. PCT/CN2018/072028, filed on Jan. 10, 2018, which is based upon claims the priority to the Chinese Patent Application NO. 201710440056.2, entitled "DISPLAY SCREEN, SPLICING DISPLAY SCREEN AND DISPLAY DEVICE", filed on Jun. 12, 2017, the entire contents of which are hereby incorporated by reference.

TECHNICAL FIELD

The present disclosure relates to the field of display technologies, and in particular, to a display screen, a splicing display screen, and a display device.

BACKGROUND

With the development of display technologies, users' requirements for display screens are getting higher and higher, not only for display quality, but also for the aesthetic appearance of display screens, such as a narrow bezel display screen pursued by users.

Generally, the display screen, especially the large-sized display screen, has a non-display region, that is, a bezel area of the display screen. In order to meet the needs of the user, manufacturers try to reduce the area of the non-display region by various packaging techniques. However, it is not possible to make the display screen completely free of non-display regions.

Therefore, how to visually realize that the display screen does not have a non-display region is an urgent problem to be solved.

SUMMARY

In view of this, embodiments of the present disclosure provide a display screen, a splicing display screen, and a display device.

According to an aspect of the present disclosure, a display screen is provided, including: a display panel with a display region and a non-display region, wherein the display region includes an intermediate display region and a peripheral display region surrounding the intermediate display region; an image expansion structure disposed in the peripheral display region, wherein the image expansion structure is configured to expand an image displayed by the peripheral display region of the display panel to the non-display region to cover the non-display region.

In an embodiment, the display screen may further include: a transparent protective cover disposed on the display panel.

In one embodiment, the image expansion structure may be disposed on a side of the transparent protective cover away from the display panel.

In an embodiment, the image expansion structure may include a plurality of columnar optical fibers closely arranged; an area of an end surface of the optical fiber near the transparent protective cover may be smaller than an area of an end surface of the optical fiber away from the transparent protective cover; and the end surfaces of all the optical fibers away from the transparent protective cover may be located in the same plane.

In an embodiment, the display screen may further include: a bezel packaging the display panel and the transparent protective cover, wherein a center axis of the optical fiber is inclined to the bezel, and the angle θ between the central axis of the optical fiber and the transparent protective cover satisfies $\tan\theta = d/a = h/(l+a)$, wherein d represents thickness of the bezel, l represents width of the bezel, and a represents the distance between the optical fiber adjacent to the bezel and the bezel on the plane of the transparent protective cover, and h represents vertical height of the optical fiber.

In one embodiment, the image expansion structure may further include an opaque colloid filled in a gap between the optical fibers.

In one embodiment, the optical fibers in the image expansion structure may respectively correspond to pixels in the peripheral display region.

In one embodiment, a shape of any one of the two end surfaces of the optical fiber may be the same as a shape of the corresponding pixel.

In one embodiment, the area of the end surface of the optical fiber near the transparent protective cover may be equal to the area of the corresponding pixel.

In one embodiment, one of the optical fibers in the image expansion structure may correspond to a plurality of pixels in the peripheral display region.

In one embodiment, the end surface of the optical fiber may be a regular polygon or a circle.

In one embodiment, the area of the pixels in the peripheral display region may be sequentially decreased in a direction from the peripheral display region to the non-display region.

In one embodiment, the distance between adjacent two pixels in the peripheral display region may gradually increase in a direction from the peripheral display region to the non-display region.

In one embodiment, the display screen may further include: a gate line and a data line, the gate line and the data line being disposed in accordance with a shape of a pixel in the display panel.

According to another aspect of the present disclosure, a splicing display screen is provided, including a plurality of the above display screens arranged in a matrix.

According to still another aspect of the present disclosure, a display device is provided, including the above splicing display screen.

DETAILED DESCRIPTION

In order to make the objects, technical solutions and advantages of the present disclosure clearer, the present disclosure will be further described in detail below with reference to the accompanying drawings. Obviously, the described embodiments are only a part of the embodiments of the present disclosure, and not all the embodiments. All other embodiments obtained by those of ordinary skilled in the art based on the embodiments of the present disclosure without creative efforts are within the scope of the present disclosure.

The specific embodiments of a display screen, a splicing display screen and a display device provided by the embodiments of the present disclosure are described in detail below with reference to the accompanying drawings.

The thickness and shape of each film layer in the drawings do not reflect the true ratio, and the purpose of the drawings is only to illustrate the present disclosure.

Figure 1:
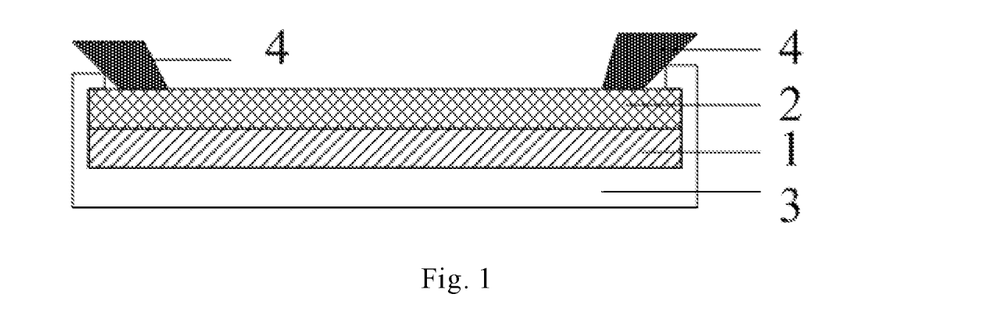
FIG. 1 is a schematic structural diagram of a display screen provided by an embodiment of the present disclosure.

A display screen provided by the embodiment of the present disclosure, as shown in FIG. 1, includes: a display panel 1 and a transparent protective cover 2 covering the display panel 1. The display region of the display panel 1 includes an intermediate display region and a peripheral display region surrounding the intermediate display region. The display screen further includes an image expansion structure 4 located in the peripheral display region and on the side of the transparent protective cover 2 away from the display panel 1.

The image expansion structure 4 is configured to expand an image displayed by the peripheral display region of the display panel 1 to a non-display region to cover the non-display region.

With the image expansion structure, the image displayed by the peripheral display region of the display panel is expanded to the non-display region to cover the non-display region, and therefore, visually, the displayed image also exists in the non-display region, that is, the display screen completely free of the non-display region can be realized visually.

Figure 2A:
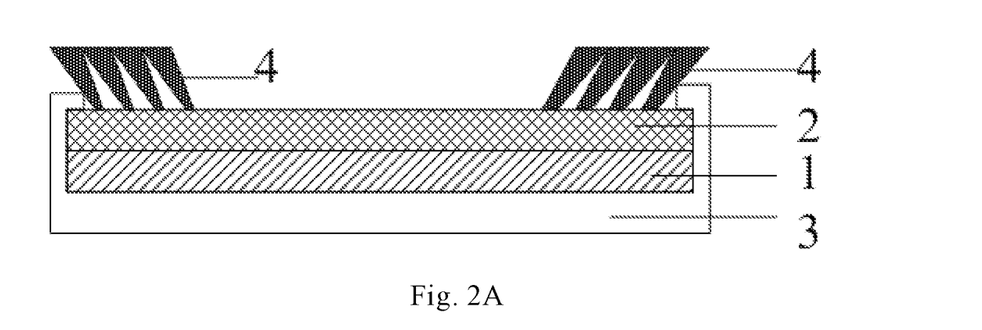
FIG. 2A is another schematic structural diagram of a display screen provided by an embodiment of the present disclosure.
Figure 2B:
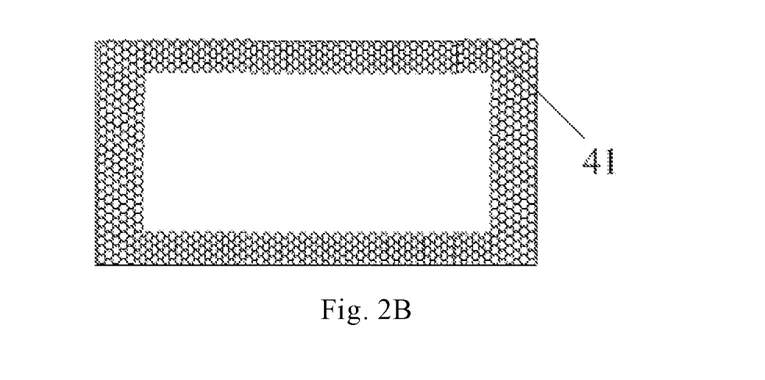
FIG. 2B is a schematic top plan view of a display screen provided by an embodiment of the present disclosure.

Specifically, in the display screen provided by the embodiment of the present disclosure, as shown in FIG. 2A and FIG. 2B, the image expanding structure 4 may include a plurality of columnar optical fibers 41 closely arranged. An area of an end surface of the optical fiber near the transparent protective cover 2 may be smaller than an area of an end surface of the optical fiber away from the transparent protective cover 2. The end surfaces of all the optical fibers 41 away from the transparent protective cover 2 may be in the same plane.

The image expansion structure is configured to be an optical fiber with different areas of the two end surfaces, and the smaller area of the end surface of the optical fiber near the transparent protective cover, so that the image displayed in the peripheral display region enters the optical fiber from the smaller area of the end surface of the optical fiber, and is transmitted to the larger area of the end surface of the optical fiber, thus the area of the region displaying image visually seen is larger than the area of the region of the display panel displaying the image. Therefore, the image magnified by the image expansion structure is also displayed on the non-display region, and the display screen without the non-display region is visually formed.

According to the embodiment, the material used for the optical fiber may be high transparency silicon dioxide, a mixture of a small amount of doped silicon dioxide, fluorine glass or any other material capable of achieving the function, which is not limited herein.

In the display screen provided by the embodiment of the present disclosure, the display screen may further include a bezel packaging the display panel and the transparent protective cover, wherein a partial region of the bezel covers the non-display region of the display panel to hold the display panel and the transparent protective cover.

Figure 3:
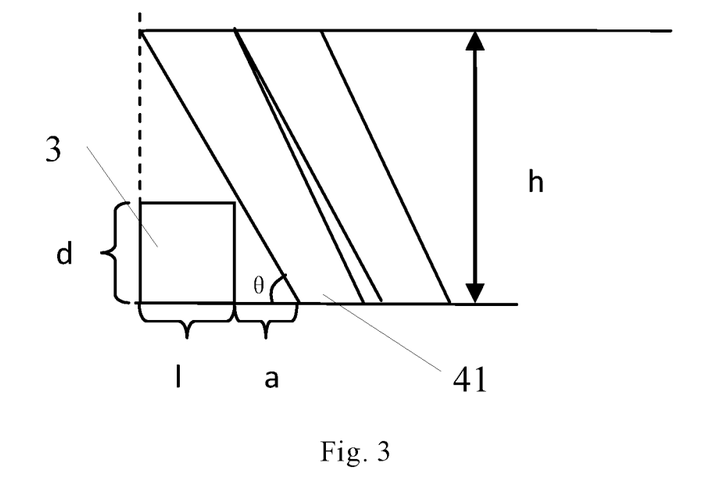
FIG. 3 is another schematic structural diagram of a display screen provided by an embodiment of the present disclosure.
Figure 4A:
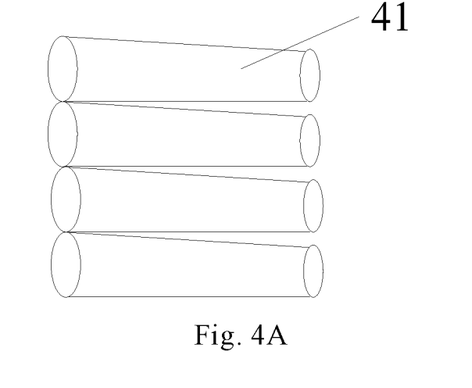
FIG. 4A is a schematic view showing an arrangement structure of an optical fiber having a circular cross section provided by an embodiment of the present disclosure.
Figure 4B:
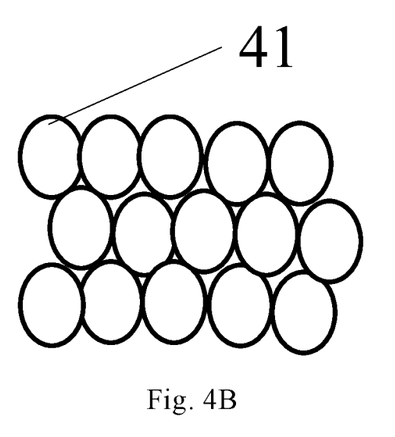
FIG. 4B is a schematic top plan view showing an arrangement structure of an optical fiber having a circular cross section provided by an embodiment of the present disclosure.
Figure 5A:
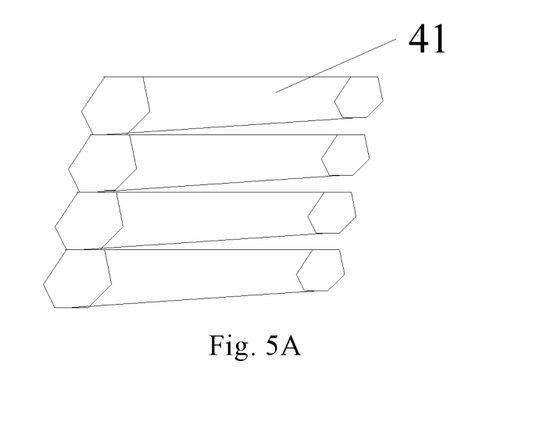
FIG. 5A is a schematic view showing an arrangement structure of an optical fiber having a hexagonal cross section provided by an embodiment of the present disclosure.
Figure 5B:
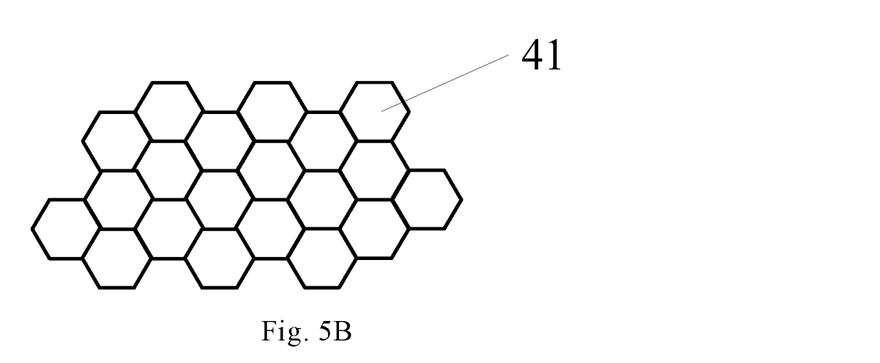
FIG. 5B is a schematic top plan view showing an arrangement structure of an optical fiber having a hexagonal cross section provided by an embodiment of the present disclosure.

According to an embodiment, the end surface of the optical fiber away from the transparent protective cover may be located above the bezel to expand the image displayed by the display panel through the optical fiber to shield the bezel. However, in order to block the bezel to the greatest extent, the area of the end surface of the optical fiber away from the transparent protective cover may be designed to be too large, so that the gap existing between the optical fibers becomes excessive. In this case, there may be more serious light leakage when displaying the image, resulting in poor display quality. In order to solve the above problem, in an embodiment, as shown in FIG. 1 and FIG. 3, the display screen according to the embodiment of the present disclosure may further include: a bezel 3 packaging the display panel 1 and the transparent protective cover 2; wherein the central axis of the optical fiber 41 is inclined to the bezel 3, and the angle θ between the central axis of the optical fiber 41 and the transparent protective cover 2 satisfies tan θ=d/a=h/(l+a), wherein d represents thickness of the bezel, l represents width of the bezel, and a represents the distance between the optical fiber adjacent to the bezel and the bezel on the plane of the transparent protective cover, and h represents vertical height of the optical fiber According to the embodiment, by disposing the optical fiber at a certain angle with the transparent protective cover, the difference in area between the two end surfaces of the optical fiber is reduced, thereby reducing the gap between two adjacent optical fibers, and thus reducing light leakage. According to the embodiment, the distance a between the optical fiber adjacent to the bezel and the bezel on the plane of the transparent protective cover can be experimentally obtained during the actual test, and the thickness d of the bezel is determined, so that the angle θ between the central axis of the optical fiber and the transparent protective cover can be determined.

In an embodiment, in the display screen provided by the embodiment of the present disclosure, the image expansion structure may further include an opaque colloid (not shown) filled in the gap between the optical fibers. The optical fibers can be bonded together to form a fiber group by filling the gap between the optical fibers with the opaque colloid, and the optical crosstalk between the optical fibers can be prevented by filling the gap between the optical fibers with the opaque colloid, thereby improving the display quality.

According to the embodiment, the opaque colloid may be black silicone or any other material capable of achieving the function, which is not limited herein.

In order to accurately display the image through the image expansion structure, in the display screen provided by the embodiment of the present disclosure, one fiber in the image expansion structure may correspond to one pixel in the peripheral display region. This arrangement allows the data displayed by one pixel to be transmitted only in one fiber for accurate display. However, in order to achieve the level of the size of the optical fiber to the level of the size of the pixel, a higher fiber manufacturing process is required.

When the size of the optical fiber cannot reach the size of the pixel, in the display screen provided by the embodiment of the present disclosure, one optical fiber in the image expansion structure may correspond to a plurality of pixels in the peripheral display region.

In an embodiment, in the display screen provided by the embodiment of the present disclosure, when one fiber corresponds to one pixel in the peripheral display region, the shapes of the two end surfaces of the optical fiber may be the same as the shape of the corresponding pixel. The shape of the two end surfaces of the optical fiber is the same as the shape of the pixel, which facilitates the corresponding arrangement of the optical fiber and the pixel, and further facilitates the arrangement of the optical fiber on the transparent protective cover.

In an embodiment, in the display screen provided by the embodiment of the present disclosure, when one optical fiber corresponds to one pixel in the peripheral display region, the area of the end surface of the optical fiber near the transparent protective cover is equal to the area of the corresponding pixel.

In the display screen provided by the embodiment of the present disclosure, as shown in FIGS. 4A to 5B, the end surface of the optical fiber 41 may be a regular polygon or a circle. According to the transmission characteristics of the optical fiber, the optimal transmission effect can be obtained when the end surface/cross section of the optical fiber is circular. When the end surface/cross section of the optical fiber is a regular polygon, it is more advantageous to form a plane of the end surface of the optical fiber closely arranged away from the transparent protective cover to prevent the occurrence of light leakage.

Figure 6:
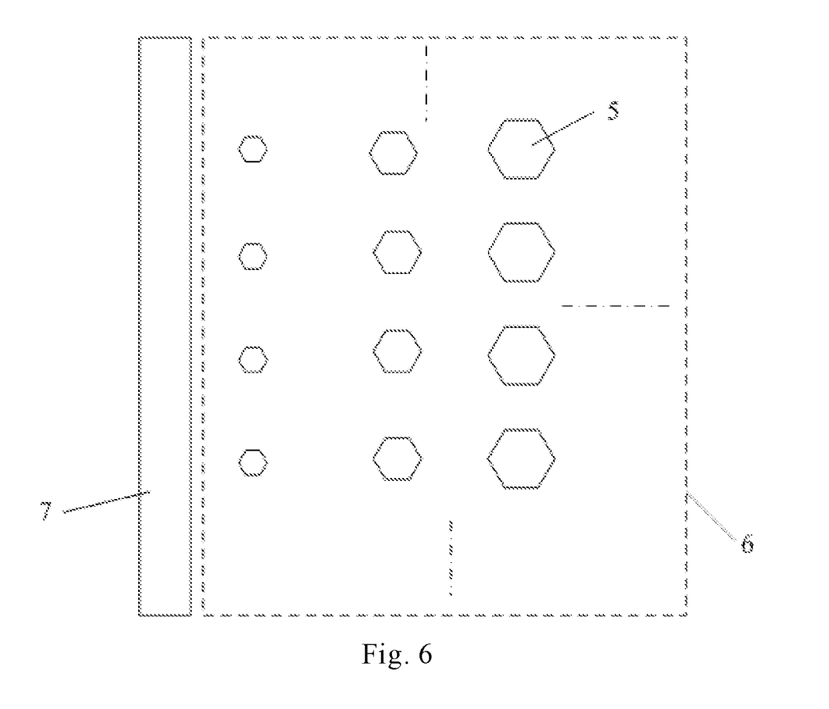
FIG. 6 is a schematic structural diagram of a structure and an arrangement manner of a pixel provided by an embodiment of the present disclosure.

In order to make the size of the image displayed by the end surface of the optical fiber coincide with the size of the image displayed by the central display region of the display panel, to avoid visual differences. As shown in FIG. 6, in the display screen provided by the embodiment of the present disclosure, the area of the pixels 5 in the peripheral display region 6 may be sequentially decreased in a direction from the peripheral display region 6 to the non-display region 7 of the display panel.

Since the area of the pixel located in the peripheral display region is sequentially decreased in the direction from the peripheral display region to the non-display region of the display panel, that is, gradually decreasing from the outward direction of the center of the display panel, the width of the black matrix between the pixels in the peripheral display region increases as the area of the pixel decreases in the direction from the peripheral display region to the non-display region.

Figure 7:
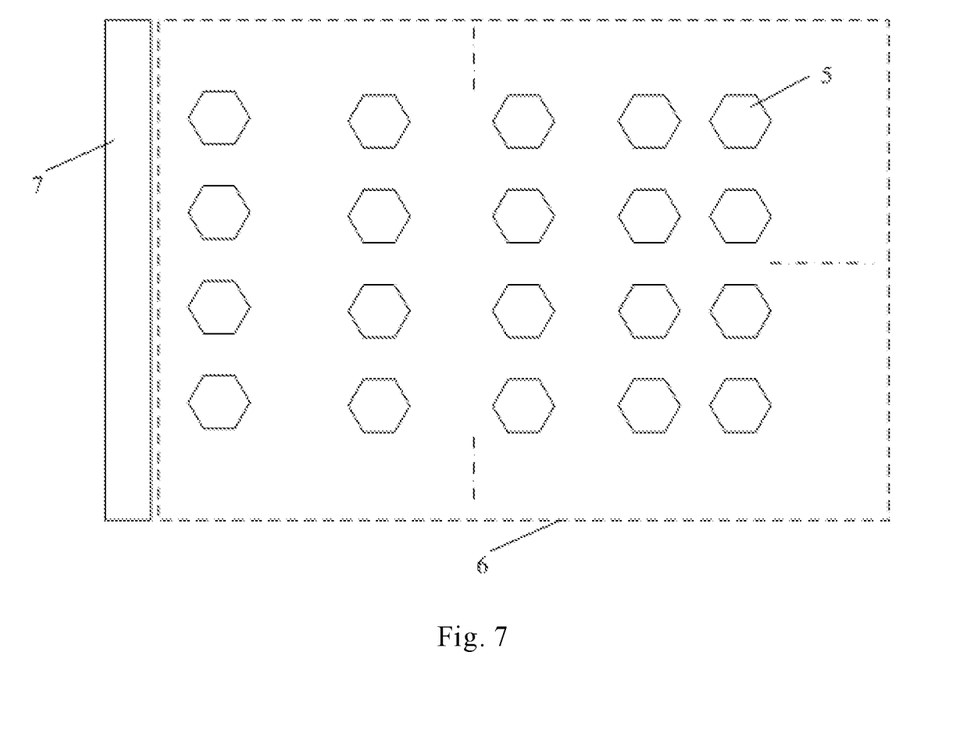
FIG. 7 is another schematic structural diagram of a structure and an arrangement manner of a pixel provided by an embodiment of the present disclosure.

In order to further expand the image displayed by the display panel to block the bezel, as shown in FIG. 7, in the display screen provided by the embodiment of the present disclosure, in the direction from the peripheral display region 6 to the non-display region 7 of the display panel, the distance between adjacent two pixels 5 can be gradually increased.

In particular, the distance between pixels in the central display region may be equal. Different from the case that the distance between pixels in the central display region is equal, the distance between the pixels in the peripheral display region gradually increases as it approaches the non-display region of the display panel. Compared with the case where the pixels in the peripheral display region are disposed to be the same as the pixels of the central display region, that is, compared with the case where the distance between the pixels in the peripheral display region is equal and the distance between the pixels in the central display region is the same, the distance between the pixels in the peripheral display region disposed like this and the non-display region of the display panel becomes smaller, so that the inclination of the optical fiber to the direction of the bezel can be reduced, that is, the angle θ between the optical fiber and the transparent protective cover can be increased. Therefore, even if the optical fiber is disposed to almost perpendicular to the transparent protective cover, the purpose of shielding the non-display region of the display panel can be achieved.

Figure 8:
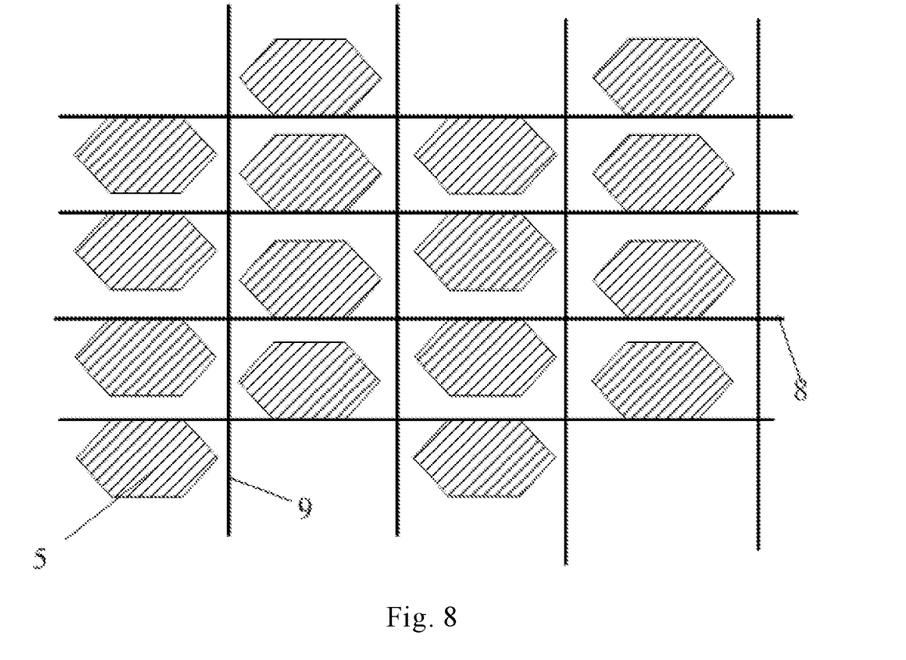
FIG. 8 is a schematic structural diagram of a pixel structure, a data line, and a gate line in a display panel provided by an embodiment of the present disclosure.

As shown in FIG. 8, the display screen provided by the embodiment of the present disclosure may include a gate line 8 and a data line 9, wherein the gate line 8 extends along the row direction of the pixel 5 and the data line 9 extends along the column direction of the pixel 5, which drive the pixel to display.

Figure 9:
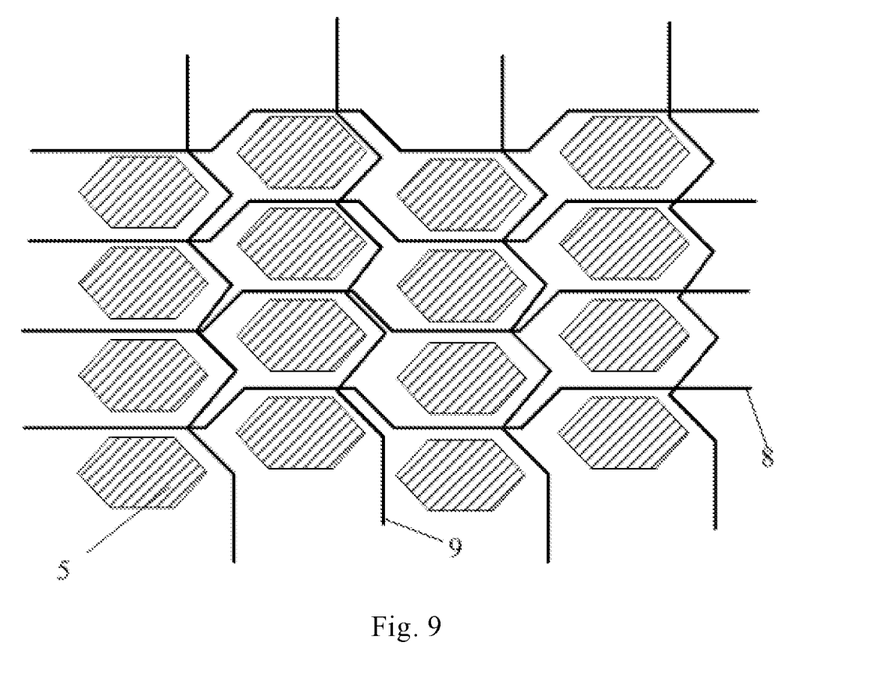
FIG. 9 is another schematic structural diagram of a pixel structure, a data line, and a gate line in a display panel provided by an embodiment of the present disclosure.

As shown in FIG. 9, the display screen provided by the embodiment of the present disclosure may include a gate line 8 and a data line 9, and the gate line 8 and the data line 9 are disposed according to the shape of the pixel 5 in the display panel. By disposing the gate line and the data line in this way, the area of the black matrix can be reduced, which is advantageous for increasing the aperture ratio and achieving high pixel display.

Based on the same inventive concept, an embodiment of the present disclosure further provides a splicing display screen, including any one of the display screens provided by the embodiments of the present disclosure arranged in a matrix. Since the principle of solving the problem by the splicing display screen is similar to any of the foregoing display screens, the implementation of the splicing display screen can be referred to the implementation of the foregoing display screen, and the repeated description is omitted.

According to the embodiment, since each display screen is bezel-less, when the splicing is performed by using the above bezel-less display screen, for the splicing display screen, the sense of segmentation of the picture will not occur between the screens, thereby improving the display quality.

Based on the same inventive concept, an embodiment of the present disclosure further provides a display device, including any of the above splicing display screens provided by the embodiments of the present disclosure. The display device may be: a display device at an exhibition, an advertisement display device between buildings, or other display devices requiring large display regions disposed at any position. Since the principle of solving the problem of the display device is similar to any of the foregoing splicing display screens, the implementation of the display device can be referred to the implementation of the splicing display screen described above, and the repeated description is omitted.

The above embodiments of the present disclosure provide a display screen, a splicing display screen including the display screen, and a display device including the splicing display screen. The display screen includes: a display panel with a display region and a non-display region, wherein the display region includes an intermediate display region and a peripheral display region surrounding the intermediate display region; an image expansion structure disposed in the peripheral display region, wherein the image expansion structure is configured to expand an image displayed by the peripheral display region of the display panel to the non-display region to cover the non-display region. With the image expansion structure, the image displayed by the peripheral display region of the display panel is expanded to the non-display region to cover the non-display region, and therefore, visually, the displayed image also exists in the non-display region, that is, the display screen totally without the non-display region can be realized visually.

It will be apparent to those skilled in the art that various changes and modifications can be made for the present disclosure without departing from the spirit and scope of the present disclosure. Thus, if such modifications and variations of the present disclosure belong to the scope of the appended claims of the present disclosure and their equivalents, the present disclosure is intended to include such modifications and variations.

What is claimed is:

1. A display screen, comprising:
    a display panel, comprising a display region and a non-display region, wherein the display region comprises an intermediate display region and a peripheral display region surrounding the intermediate display region; and
    an image expansion structure in the peripheral display region,
    wherein the image expansion structure is configured to expand an image displayed by the peripheral display region of the display panel to a direction of the non-display region to cover the non-display region;
    a transparent protective cover, disposed on the display panel,
    wherein the image expansion structure is disposed on a side of the transparent protective cover away from the display panel, the image expansion structure comprises a plurality of columnar optical fibers closely arranged; an area of an end surface of the optical fiber near the transparent protective cover is smaller than an area of an end surface of the optical fiber away from the transparent protective cover; and the end surfaces of all the optical fibers away from the transparent protective cover are in a same plane, and areas of the pixels in the peripheral display region are sequentially decreased in a direction from the peripheral display region to the non-display region;
    distances between adjacent two pixels with different sizes in the peripheral display region are gradually increased in the direction from the peripheral display region to the non-display region.

2. The display screen according to claim 1, further comprising: a bezel packaging the display panel and the transparent protective cover, wherein a center axis of the optical fiber is inclined to the bezel, and an angle θ between the central axis of the optical fiber and the transparent protective cover satisfies tan θ=d/a=h/(l+a), wherein d represents a thickness of the bezel, l represents a width of the bezel, a represents a distance between the optical fiber adjacent to the bezel and the bezel on a plane of the transparent protective cover, and h represents a vertical height of the optical fiber.

3. The display screen according to claim 1, wherein the image expansion structure further comprises an opaque colloid filled in a gap between the optical fibers.

4. The display screen according to claim 1, wherein one of the optical fibers in the image expansion structure correspond to one pixel in the peripheral display region.

5. The display screen according to claim 4, wherein a shape of any one of two end surfaces of the optical fiber is the same as a shape of a corresponding pixel.

6. The display screen according to claim 5, wherein the area of the end surface of the optical fiber near the transparent protective cover is equal to the area of the corresponding pixel.

7. The display screen according to claim 1, wherein one of the optical fibers in the image expansion structure corresponds to a plurality of pixels in the peripheral display region.

8. The display screen according to claim 1, wherein the end surface of the optical fiber is a regular polygon or a circle.

9. The display screen according to claim 1, further comprising: a gate line and a data line, the gate line and the data line being disposed in accordance with a shape of a pixel in the display panel.

10. A splicing display screen, comprising a plurality of display screens according to claim 1, wherein the plurality of display screens are arranged in a matrix.

11. A display device, comprising the splicing display screen of claim 10.

12. A splicing display screen, comprising a plurality of display screens according to claim 2, wherein the plurality of display screens are arranged in a matrix.

* * * * *